United States Patent [19]
Conway

[11] Patent Number: 5,949,633
[45] Date of Patent: Sep. 7, 1999

[54] FLUORESCENT LAMP DRIVE SYSTEM WITH TRANSFORMER OVER-VOLTAGE PROTECTION CIRCUIT

[75] Inventor: David W. Conway, Cedar Rapids, Iowa

[73] Assignee: Rockwell International Corporation, Costa Mesa, Calif.

[21] Appl. No.: 08/962,157

[22] Filed: Oct. 31, 1997

[51] Int. Cl.$^6$ .................................................. H02H 7/04
[52] U.S. Cl. ............................ 361/91; 361/36; 361/38
[58] Field of Search ............................. 361/18, 39, 35, 361/38, 20, 21, 36, 78, 86, 88, 89, 91, 113

[56] References Cited

U.S. PATENT DOCUMENTS

| | | | |
|---|---|---|---|
| 4,114,072 | 9/1978 | Willis | 315/411 |
| 4,236,187 | 11/1980 | Mochizuki et al. | 361/36 |
| 4,709,321 | 11/1987 | Trantham | 363/56 |
| 4,788,618 | 11/1988 | Kimura | 361/86 |
| 5,079,666 | 1/1992 | Najm | 361/85 |
| 5,572,413 | 11/1996 | Hirahara | 363/21 |

*Primary Examiner*—Jeffrey Gaffin
*Assistant Examiner*—Kim Huynh
*Attorney, Agent, or Firm*—Kyle Eppele; James P. O'Shaughnessy

[57] ABSTRACT

A transformer over-voltage protection circuit shuts down a resonant inverter when high voltages occur at the output of a transformer. The high voltages can be caused by a broken or removed display tube. The system is designed to be used in display system, such as, an active matrix liquid crystal display (AMLCD). The system senses the voltage at the output of the transformer by utilizing a tickler or a tertiary winding. The signal from the tertiary winding is rectified and compared to a threshold. If the signal from the tertiary winding is greater than the threshold, the inverter is shut down for a period of time.

3 Claims, 3 Drawing Sheets

{ 5,949,633 }

FLUORESCENT LAMP DRIVE SYSTEM WITH TRANSFORMER OVER-VOLTAGE PROTECTION CIRCUIT

FIELD OF THE INVENTION

The present invention relates generally to lighting systems. More particularly, the present invention relates to lighting systems which utilize a fluorescent lamp.

BACKGROUND OF THE INVENTION

Displays, such as, active matrix liquid crystal displays (AMLCDs), often utilize a back light source that is capable of producing wide dynamic luminance ranges. The back light source generally includes a resonant inverter with a transformer and a drive circuit and a fluorescent tube or lamp.

The drive circuit generates a low voltage, high frequency alternating current (AC) signal which is received by a primary winding of the transformer. The transformer steps up the low voltage, high frequency AC signal to a high voltage, high frequency AC signal that is provided by a secondary winding of the transformer to the fluorescent lamp. The high voltage, high frequency AC signal is typically provided to a high voltage output to which the lamp is attached. The fluorescent lamp emits light in response to the high voltage, high frequency AC signal from the transformer.

If the lamp is defective (e.g., broken) or disconnected from the socket, the voltage at the high voltage output can reach excessive levels. These extremely high voltages can cause catastrophic transformer insulation failure. Transformer insulation failure can result in a malfunction of the display system as well as create smoke and arcing which can be a considerable nuisance in an aircraft cockpit.

Replacing a display system such as in an aircraft application is particularly difficult due to the top level assembly associated with back light sources. Additionally, labor costs associated with replacing aircraft equipment are expensive. Therefore, there is a need to monitor the voltage level at the high voltage output and to prevent transformer insulation failures.

Heretofore, back light sources or display systems have determined whether an over-voltage condition exists at the high voltage output by directly sensing the voltage at the high voltage output. However, sensing the high voltage, high frequency AC signal at the high voltage output requires high voltage components which are expensive and must be isolated from lower voltage logic circuitry. Therefore, conventional over-voltage circuitry is expensive.

Thus, there is a need for a less expensive over-voltage protection circuit for a display system. Further still, there is a need for a back light source in a display system that includes over-voltage protection.

SUMMARY OF THE INVENTION

The present invention relates generally to an over-voltage protection circuit for a fluorescent lamp drive system. The fluorescent lamp drive system includes a resonant inverter with a transformer, and a fluorescent display tube or lamp. The transformer has a first winding coupled to the drive circuit inverter and a second winding coupled to the display tube. The drive circuit has a shut down input. The over-voltage protection circuit includes a third winding in magnetic communication with the first and second winding and a control circuit coupled to the third winding. The third winding provides a sense signal. The over-voltage protection control circuit provides a shut down signal to the shut down input when the voltage sense signal is above a threshold. The threshold represents an over-voltage condition.

The present invention further relates to a fluorescent lamp drive system for use with a display tube. The display system includes a transformer having a primary winding, a secondary winding, and a tertiary winding. The secondary winding is coupled to the display tube and provides a high voltage display signal to the display tube. The drive circuit has a shut down input and a drive signal output. The drive signal output is coupled to the first winding of the transformer. The drive circuit provides a drive signal at the drive signal output. The over-voltage protection circuit is coupled to the tertiary winding and provides a shut down signal to the shut down input in response to a voltage across the tertiary winding being above a threshold. The drive circuit disables the drive signal in response to the shut down signal.

The present invention still further relates to a fluorescent lamp drive system including a display tube emitting light in response to a high voltage display signal. The fluorescent lamp drive system includes a transformer means for receiving a low voltage drive signal and for generating the high voltage display signal, a drive means for providing the drive signal, and an over-voltage protection means for disabling the display signal in response to a sense signal. The transformer means generates the sense signal indicative of the high voltage display signal.

In one exemplary aspect of the present invention, an over-voltage protection circuit receives a sense signal from an auxiliary winding of a transformer. The use of the auxiliary or tertiary winding allows the over-voltage protection circuit to determine the voltage level at the high voltage output with appropriate isolation. Therefore, the over-voltage protection circuit advantageously does not require high voltage circuitry.

According to another exemplary aspect of the present invention, the fluorescent lamp drive system includes a pulse width modulated driver circuit that uses a soft start input and a shut down input. The over-voltage protection circuit provides a shut down signal to the shut down input to cause the driver circuit to disable generation of the high voltage display signal. The display signal is disabled by preventing generation of the drive signal which is provided to a transformer. The shut down signal is removed when the over-voltage condition no longer exists such as upon shut down of the driver. The shut down signal does not latch. After a delay time of approximately 500 milliseconds following the generation of the shut down signal, the over-voltage protection circuit provides a soft start signal to the soft start input. The driver circuit performs a soft start in response to the soft start signal at the soft start input to gradually increase the duty cycle to normal levels, thereby reliably turning on the display tube or lamp and relieving stress in components associated with the display system.

BRIEF DESCRIPTION OF THE DRAWINGS

Preferred exemplary embodiments of the present invention will hereafter be described with reference to the accompanying drawings, wherein like numerals denote like elements and.

DETAILED DESCRIPTION OF PREFERRED EXEMPLARY EMBODIMENTS

Figure 1:
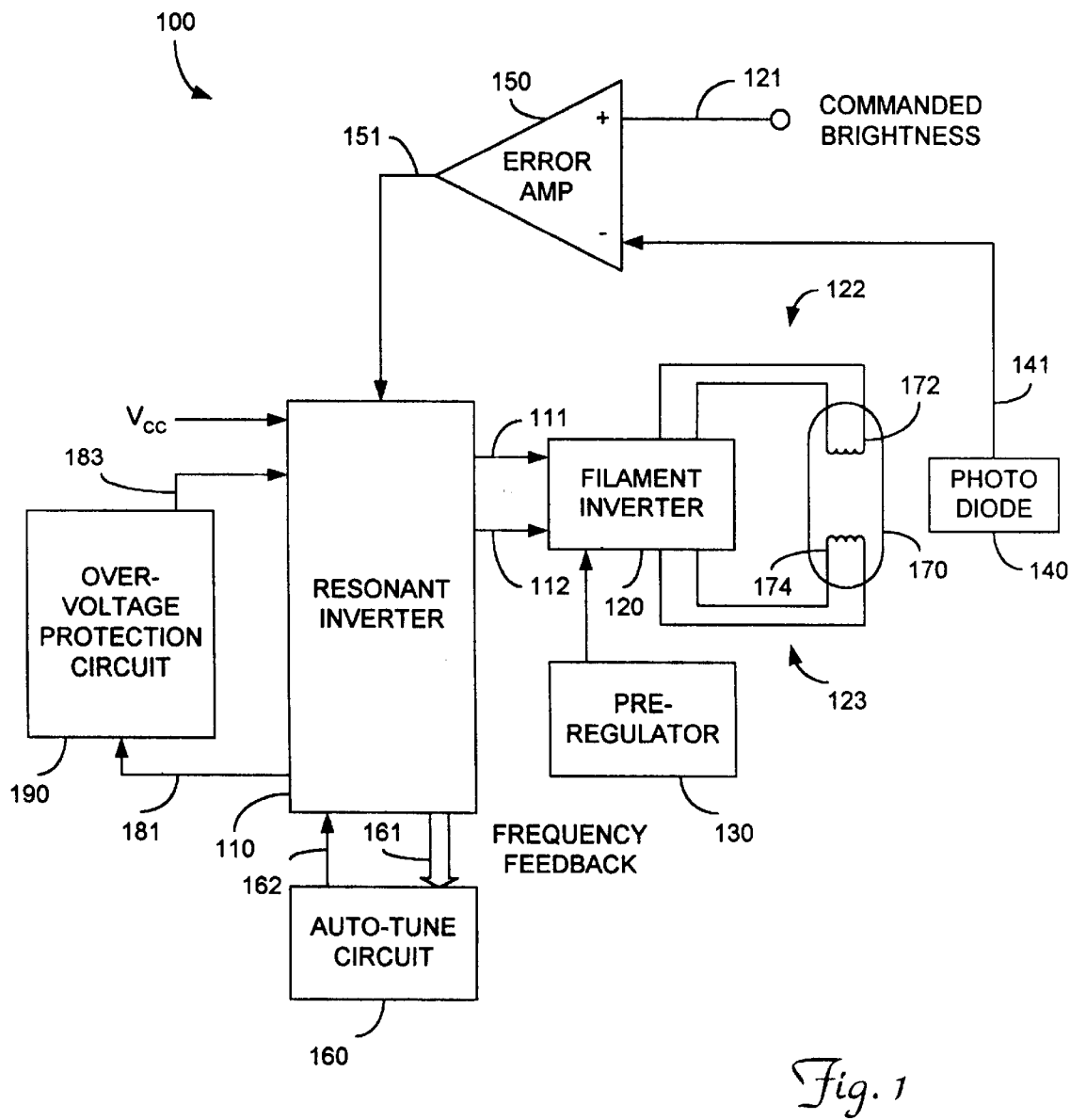
FIG. 1 is a general electrical schematic block diagram of a fluorescent lamp drive system in accordance with an exemplary embodiment of the present invention.

With reference to FIG. 1, a fluorescent lamp drive system or circuit 100 is coupled to filaments 172 and 174 of lamp 170. Fluorescent lamp drive system 100 includes a current fed or resonant inverter 110, a filament inverter 120, a preregulator 130, a photodiode 140, an error amplifier 150, an auto-tune circuit 160, and an over-voltage protection circuit 190. Fluorescent lamp drive system 100 is used to adjustably drive fluorescent lamp 170 over a wide luminance range. Fluorescent lamp drive system 100 also optimizes the efficiency of the energy transfer process as the impedance of lamp 170 changes. The specific operation of resonant inverter 110, inverter 120, preregulator 130, photodiode 140, amplifier 150, and circuit 160 does not limit the scope of the invention and is only described to give an exemplary environment for circuit 100.

Resonant inverter 110 is coupled to voltage source Vcc from which it receives power for conversion to a high voltage sinusoidal, waveform or a near sinusoidal waveform (e.g., the display signal) that is used to drive cathode coils or filaments 172 and 174 of lamp 170. Resonant inverter 110 is also coupled to output 151 of error amplifier 150, to filament inverter 120 through resonant inverter outputs 111 and 112, and to auto-tune circuit 160 through frequency feedback 161 and auto-tune output 162. Although outputs 111 and 112 are coupled to lamp 170 through inverter 120, inverter 110 and outputs 111 and 112 are considered coupled to lamp 170 for the purpose of the description of the present invention.

Filament inverter 120 is coupled to, and receives inputs from, resonant inverter 110 and preregulator 130. Filament inverter 120 is also coupled to filaments 172 and 174 of lamp 170 through filament inverter outputs 122 and 123, respectively. Filament inverter 120 drives lamp 170 with a low voltage waveform having a sufficient voltage magnitude that filaments 172 and 174 of lamp 170 are maintained in an excited state and such that the gases inside of lamp 170 are not allowed to extinguish.

Photodiode 140 is an optical feedback device in communication with lamp 170. Output 141 of photodiode 140 is coupled to the negative input of error amplifier 150. The positive input of error amplifier 150 is coupled to a Commanded Brightness input signal. Output 151 of error amplifier 150 is provided to resonant inverter 110 to control the amplitude of the high voltage waveform and, thereby, to control the luminance of lamp 170.

Resonant inverter 110 is of the type known in the art which receives DC input voltage Vcc and provides a high voltage waveform at or across outputs 111 and 112. DC input voltage Vcc can be any of a wide range of voltages, but, in the preferred embodiment of the present invention, DC input voltage Vcc varies between about 18 volts and about 32 volts. As discussed below in greater detail, the amplitude of the waveform at or across outputs 111 and 112 can be adjusted over a wide range (100 volts to 2.2 kilovolts) to control the luminance of fluorescent lamp 170, but will typically be between about 250 volts and 400 volts peak-to-peak at a frequency of approximately 58 kilohertz (KHz). The frequency of the waveform can also vary due to factors, such as, changes in the impedance of lamp 170.

Filament inverter 120 is preferably a driven square waveform inverter. Filament inverter 120 receives a DC input voltage of between about 5 volts and 8 volts from output 131 of preregulator 130 and provides a square wave of approximately the same amplitude at filament inverter outputs 122 and 123. The low voltage waveform provided by filament inverter 120 on outputs 122 and 123 has a frequency which is approximately one-half that of the high voltage waveform. The low voltage waveform is used to warm filaments (a.k.a. cathode coils) 172 and 174 and to maintain the filaments and the gases of lamp 170 in an excited state. Thus, the gases in lamp 170 are kept from extinguishing. As discussed below in greater detail, this eliminates the need to repeatedly use high voltage pulses to strike the arc of the lamp, as is required in at least some prior art dimmable lamp drive systems. Consequently, the useful lives of both lamp 170 and components of fluorescent lamp drive system 100 are extended. The high voltage waveform received by filament inverter 120 from resonant inverter 110 on outputs 111 and 112 is superimposed on the low voltage waveform on filament inverter outputs 122 and 123 using a double hot spot connection.

Photodiode 140 is of the type well-known in the art which provides a voltage output having a magnitude dependent upon the luminance level of lamp 170. The Commanded Brightness signal is a voltage signal controlled by the user or by a separate system or device to achieve a desired luminance from lamp 170. The voltage of the Commanded Brightness input has a predetermined relationship to the voltage output of photodiode 140 when lamp 170 is operating at the corresponding desired luminance. Error amplifier 150 is a conventional operational amplifier which provides an output voltage at output 151 dependent upon a difference in voltage between the Commanded Brightness signal and the output of the photodiode. The output voltage of error amplifier 150 is used by resonant inverter 110 to control the amplitude of the sinusoidal waveform provided to filament inverter 120 for driving lamp 170.

Auto-tune circuit 160 receives frequency feedback signal 161 from resonant inverter 110. Frequency feedback signal 161 is indicative of occurrences of zero crossings of the high voltage waveform generated by resonant inverter 110. Using frequency feedback 161, auto-tune circuit 160 detects occurrences of zero crossings of the high voltage waveform and generates an output signal on auto-tune output 162. The auto-tune circuit output signal is used by resonant inverter 110 to optimize the efficiency of the conversion of power from DC input voltage Vcc to the high voltage waveform used to drive the filaments of lamp 170.

Over-voltage protection circuit 190 includes a sense input 181 coupled to resonant inverter 110 and a control output 183 coupled to resonant inverter 110. Over-voltage protection circuit 190 receives a voltage sense signal at sense input 181 from resonant inverter 110 and provides control signals (e.g., shut down signal and soft start signal) at control output 183 in response to the voltage sense signal. If the voltage sense signal indicates that an over-voltage condition is occurring across lamp 170 (e.g., at outputs 111 and 112), circuit 190 provides a shut down signal to resonant inverter 110 at output 183. Sense signal on input 181 is preferably a low voltage signal which does not require high voltage components.

Resonant inverter 110 disables the high voltage signal (e.g., display signal) provided to lamp 170 in response to the shut down signal. Over-voltage protection circuit 190 can also provide a soft start signal to resonant inverter 110. Resonant inverter 110 preferably soft starts in response to the soft start signal. Circuit 190 provides a soft start signal after a predetermined time, such as, 500 milliseconds after providing the shut down signal. The soft start signal causes resonant inverter 110 to gradually start to reduce stress on components of the resonant inverter 110 and reliably turn on lamp 170.

Figure 2:
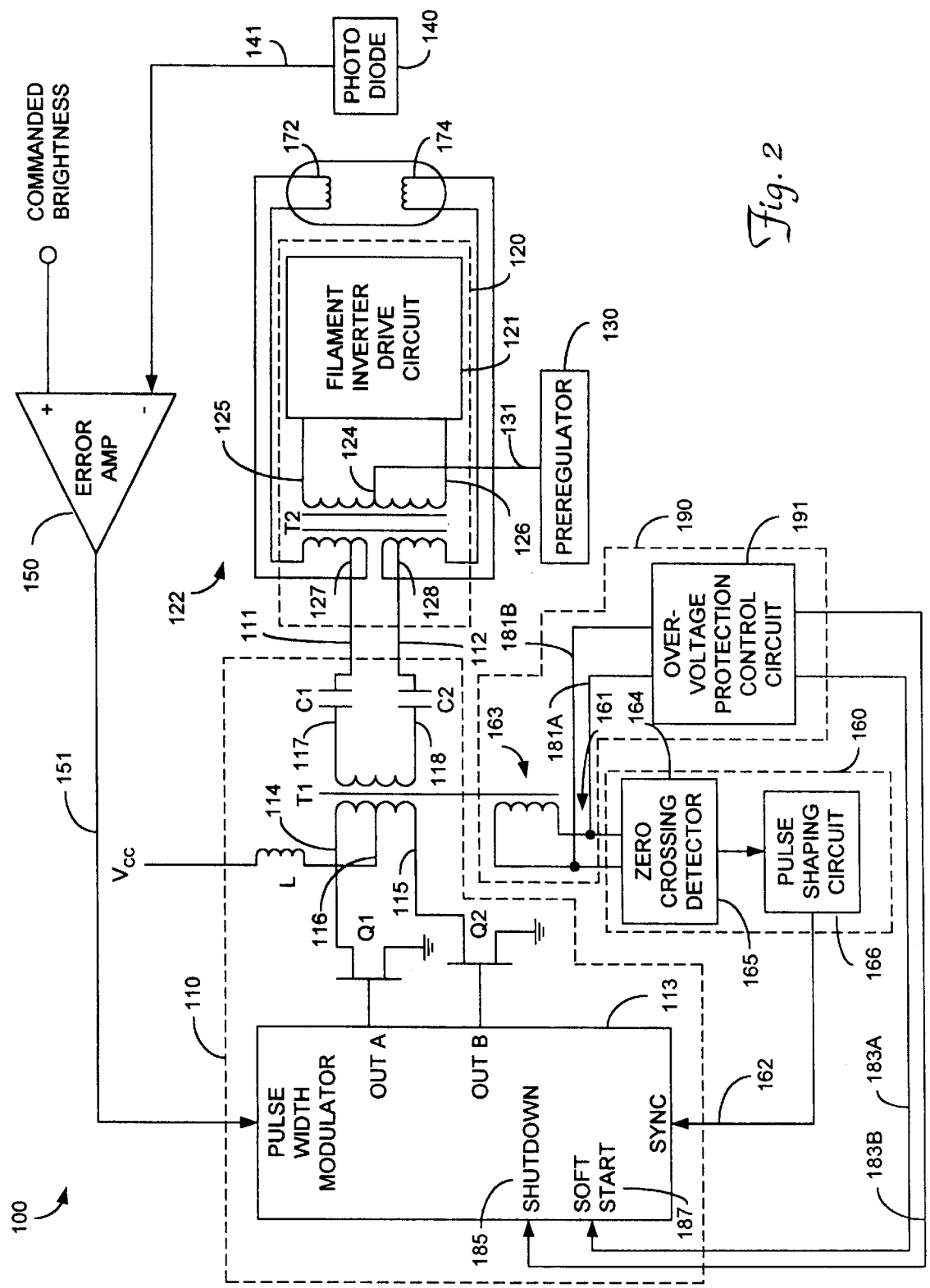
FIG. 2 is a more detailed electrical schematic block diagram of the fluorescent lamp drive system illustrated in FIG. 1.

FIG. 2 is a schematic diagram illustrating one preferred embodiment of fluorescent lamp drive system or circuit 100 in greater detail. Resonant inverter 110 includes a drive circuit such as pulse width modulator 113, transistors or semiconductor switches Q1 and Q2, inductor L, transformer T1, and capacitors C1 and C2. DC voltage Vcc is coupled to center tap connection 116 of transformer T1 through inductor L. Pulse width modulator outputs OUT A and OUT B are coupled to the control electrodes of transistors Q1 and Q2, respectively, for controlling conduction of the transistors. The drains of transistors Q1 and Q2 are respectively coupled to inputs or connections 114 and 115 at the primary side of transformer T1. Connections 117 and 118 to the secondary side of transformer T1 are coupled, each through the respective one of capacitors C1 and C2, to outputs 111 and 112 of resonant inverter 110.

When transistor Q1 is conducting, a current path is formed from DC voltage source Vcc, through a first portion of transformer T1, to transistor Q1. When transistor Q2 is conducting, a second current path is formed from DC voltage source Vcc, through a second portion of transformer T1, to transistor Q2. Pulse width modulator 113 uses control signals (sometimes referred to as a gate voltage waveform) at OUT A and OUT B to alternate conduction periods of transistors Q1 and Q2 such that both are not conducting at the same time. The result is that an approximately quasi-square wave current waveform (e.g., the drive signal) is produced in the primary side of transformer T1. This, in turn, results in the production of the high voltage waveform (e.g., the display signal) at the secondary side of transformer T1 and at outputs 111 and 112. Although the secondary side of transformer T1 is not shown directly coupled to lamp 170, it can be directly or indirectly coupled to lamp 170 in accordance with the scope of the present invention.

Filament inverter 120 includes transformer T2 and filament inverter drive circuit 121. Output 131 of preregulator 130 is coupled to center tap connection 124 of the primary side of transformer T2. Filament inverter drive circuit 121 is coupled to first and second connections 125 and 126 of the primary side of transformer T2. Filament inverter drive circuit 121 performs a function similar to transistors Q1 and Q2 of resonant inverter 110. Filament inverter drive circuit 121 alternates the conduction path from the DC voltage source provided by preregulator 130 such that a low voltage drive waveform is generated at the primary windings of transformer T2. The winding ratio of transformer T2 is preferably close to 1:1 so that low voltage waveforms are also generated at connections or outputs 122 and 123 of the secondary of transformer T2. The low voltage waveforms drive filaments 172 and 174 to maintain the gases of lamp 170 in an excited or non-extinguished state. Outputs 111 and 112 of resonant inverter 110 are coupled to center taps 127 and 128, respectively, on the secondary of transformer T2 so that the high voltage waveform is superimposed upon the low voltage waveform at outputs 122 and 123 and, thus, across filaments 172 and 174.

Auto-tune circuit 160 includes zero crossing detector 164 and pulse shaping circuit 166. Input 161 to zero crossing detector 164 is coupled to "tickler" or tertiary windings 163 on transformer T1. From the waveforms monitored at input 161, zero crossing detector 164 can detect the time at which the high voltage waveform generated by resonant inverter 110 has a zero crossing. This is consequently indicative of zero crossings of the tube or lamp voltage waveform. Output 165 of zero crossing detector 164 is indicative of the occurrence of a zero crossing. Pulse shaping circuit 166 can be any of a variety of well-known circuits designed to condition the output of zero crossing detector 164 to meet the requirements of pulse width modulator 113. Output 162 of pulse shaping circuit 166 is therefore a synchronization signal, of appropriate pulse width and height, which is indicative of the concurrent or recent realization of a zero crossing of the high voltage waveform generated by resonant inverter 110. Resonant inverter 110 uses output 162 of auto-tune circuit 160 to control the conduction of transistors Q1 and Q2 such that they can begin their respective conduction cycles at approximately the same time as a zero crossing of the high voltage waveform.

Over-voltage protection circuit 190 includes sense inputs 181A and 181B coupled across tertiary winding 163 on transformer T1 and over-voltage protection control circuit. Over-voltage protection circuit 190 rectifies the signal from tertiary winding 163 and compares it to a threshold representing an over-voltage condition across secondary connections 117 and 118 of transformer T1. According to one preferred embodiment, one-half volt of the sense signal can represent a kilovolt between connections 117 and 118 of transformer T1. If the sense signal is above a threshold, such as, 2 volts, over-voltage protection circuit 190 provides a shut down signal at a control output 183B to a shut down input 185 of pulse width modulator 113.

Pulse width modulator 113 removes signals at OUT A and OUT B, which turn off transistors Q1 and Q2, thereby disabling the display signal or high voltage signal provided to lamp 170. When transistors Q1 and Q2 are turned off, current does not flow through connections 114 and 115 of transformer T1. Therefore, in response to the shut down signal at input 185, pulse width modulator 113 disables the production of the drive signal to transformer T1 to disable generation of the display signal for lamp 170. This in turn causes the voltage across winding 163 of transformer T1 to drop below the threshold thus causing the shut-down signal to be removed allowing restarting of the system.

After a prolonged delay, such as, 500 millisecond after the production of the shut down signal, circuit 190 provides a soft start signal to soft start input 187 via control output 183A. Pulse width modulator 113 gradually increases the pulse width of the drive signals at OUT A and OUT B in response to the soft start signal. In this way, the display signal is slowly brought up to operating voltage, thereby reliably turning on lamp 170 and reducing stress on components of resonant inverter 110 and filament inverter 120. Over-voltage protection circuit 190 waits for a delay before providing the soft start signal so that transformers T1 and T2 have secondary output voltage appropriately limited to safe values to protect components of system 100.

In operation, fluorescent lamp drive system 100 illustrated in FIGS. 1 and 2 functions generally as follows. Initially, the lamp is powered down, and the output of photodiode 140 is correspondingly high. When the Commanded Brightness signal is first applied, the output of error amplifier 150 has a value which causes pulse width modulator 113 to drive transistors Q1 and Q2 at their maximum duty cycle. This causes the voltage generated at outputs 111 and 112 of resonant inverter 110 to ramp up very quickly. The resulting high voltage pulse is transferred through filament inverter 120 to filaments 172 and 174 to strike the arc of lamp 170. As the output luminance of lamp 170 increases, the feedback loop causes resonant inverter 110 to lessen the duty cycle of transistors Q1 and Q2 to clamp down the amplitude of the high voltage waveform to a level corresponding to the desired luminance.

Figure 3:
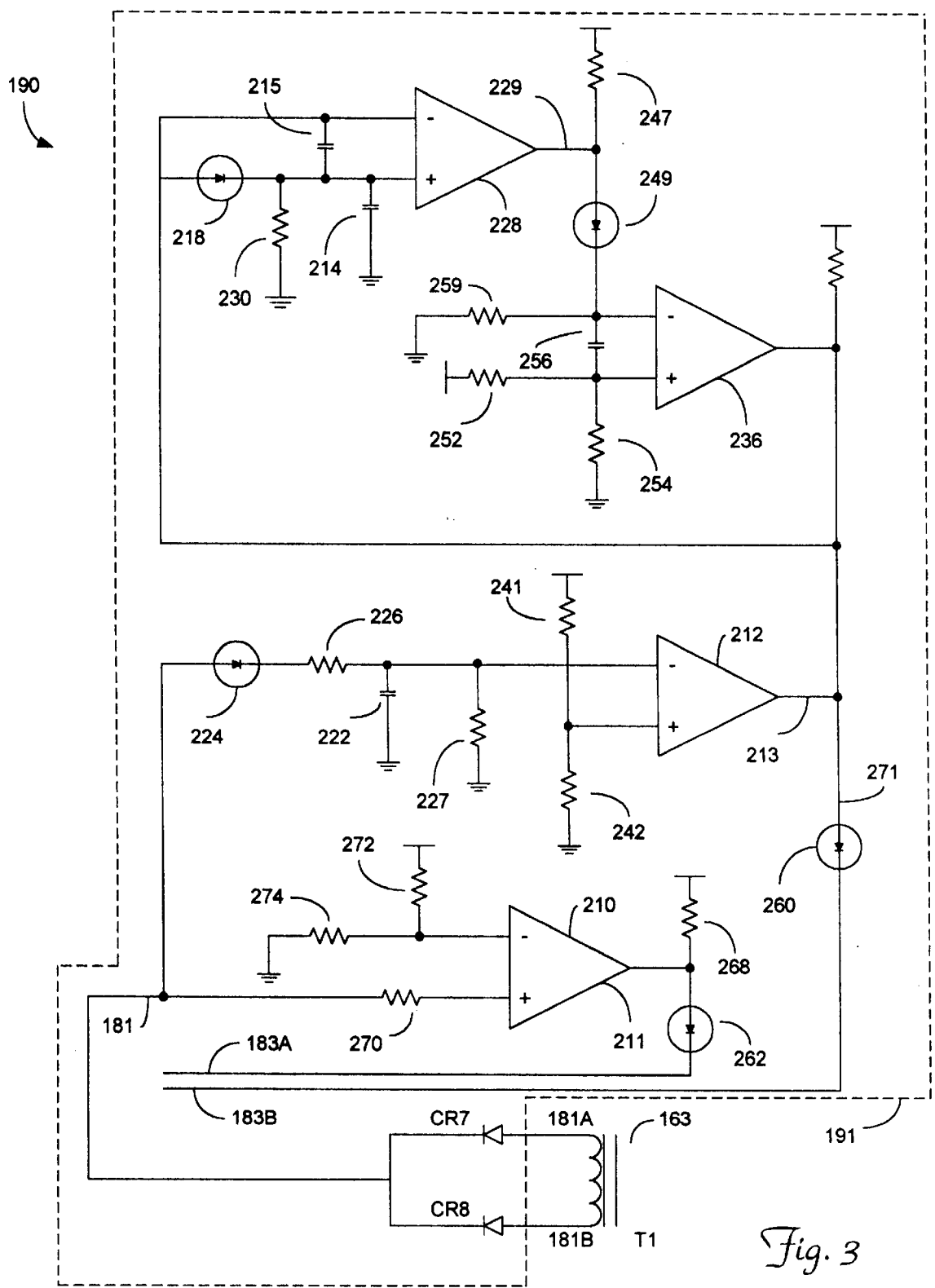
FIG. 3 is a detailed schematic diagrams of the fluorescent lamp drive system over-voltage protection circuit.

Over-voltage protection circuit 190 shown in FIG. 3 includes a capacitor 222, a diode 224, a resistor 226, a resistor 227, a resistor 241, a resistor 242, a comparator 212, a diode 218, a resistor 230, a capacitor 214, a capacitor 215, a comparator 228, a resistor 247, a diode 249, a resistor 250, a resistor 252, a resistor 254, a capacitor 256, a comparator 236, a resistor 216, a diode 260, a diode 262, a resistor 268, a comparator 210, a resistor 270, a resistor 272, diodes CR7 and CR8 and a resistor 274. The components listed above are coupled together substantially as shown in FIG. 3.

With reference to FIG. 3, the voltage sense signal tertiary winding 163 of transformer T1 is provided to sense inputs 181A and 181B of over-voltage protection control circuit 191 where it is recitified by diodes CR7 and CR8. Winding 163 can be considered part of over-voltage protection circuit 190 and as part of resonant inverter 110 and is in magnetic communication with the primary and secondary windings of transformer T1.

The voltage sense signal is received by comparator 210. Comparator 210 compares the sense signal to a threshold voltage of approximately 2 volts as set by resistance divider 272 and 274. As stated above, the voltage sense signal has a voltage of 0.5 volts per every kilovolt across connections 111 and 112. Therefore, as the voltage across connections 117 and 118 reaches approximately 4 kilovolts, comparator 210 provides a logic high signal (e.g., a shut down signal) at output 183A to input 185 of pulse width modulator 113. The logic high signal at input 185 causes pulse width modulator 113 to disable the production of the drive signal through transistors Q1 and Q2. When the voltage sense signal drops below the threshhold, comparator 210 again provides a logic low signal. It does not latch in a logic high state.

During normal operation, the sense signal is below the threshold and comparator 210 provides a logic low signal at output 183A. The logic low signal is received at input 185 and does not cause pulse width modulator 113 to disable the gate drive signals to transistors Q1 and Q2.

During normal operation, comparator 212 provides a logic high signal at output 213 because the voltage sense signal has a voltage below a threshold, such as, 0.6 volts. Therefore, when the voltage across connections 111 and 112 is less than 1.4 KV, the logic high signal at output 213 causes comparator 228 to provide a logic low signal at an output 229. The logic low signal at output 229 causes comparator 236 to provide a logic high signal at an output 237. Comparators 210, 212, 228, and 236 are open collector comparators. Therefore, when either of comparators 212 or 236 provide a logic low at outputs 213 and 237, respectively, line 271 coupled to diode 260 is brought to a logic low. When line 271 is at a logic low, output 183B is also at a logic low (e.g., a soft start signal is not provided).

If the sense signal is higher than 0.6 volts for a time greater then 22 milliseconds, comparator 212 provides a logic low signal at output 213. The logic low signal at output 213 brings line 271 to a logic low. The logic low signal at output 213 causes comparator 228 to provide a logic high signal at output 229. The logic high signal at output 229 causes comparator 236 to provide a logic low at output 237.

The logic low signal at output 237 is provided for 500 milliseconds until capacitor 214 discharges through resistor 230. Meanwhile, the voltage sense signal is reduced due to the shut down of resonant inverter 110, and comparator 212 again provides a logic high signal at output 213. Nonetheless, comparator 236 maintains line 271 logic low.

Once capacitor 214 is discharged, comparator 228 provides a logic low signal at output 229 which causes comparator 236 to provide logic high signal at output 237. The logic high signal is provided via output 183B to input 187 of PWM generator 113. Pulse width modulator 113 performs a soft start operation in response to the transition of the logic low to logic high (the soft start signal) at input 187 (e.g., line 183B).

Resistor 230 and capacitor 214 set the 500 millisecond period and can be configured for other appropriate time periods. Similarly, resistor 226 and capacitor 222 require that the voltage sense signal be a logic high for a particular amount of time, such as, 22 milliseconds before comparator 212 provides the logic low signal. The 22 millisecond period ensures that soft start signals are not provided prematurely or in response to minor and temporary voltage fluctuations.

It is understood that, while the detailed drawings, specific examples, and particular dimensions given describe preferred exemplary embodiments of the present invention, they are for the purpose of illustration only. The method and apparatus of the present invention is not limited to the precise details disclosed. For example, although specific time periods are disclosed, other periods are possible. Various changes can be made to the details disclosed without departing from the spirit of the invention defined by the following claims.

What is claimed is:

1. An over-voltage protection circuit for a fluorescent lamp drive system, the fluorescent lamp drive system comprising a resonant inverter, a transformer, and a display tube, the resonant inverter having a drive circuit and a transformer with a first winding coupled to the drive circuit and a second winding coupled to the display tube, the drive circuit having a shut down input and a soft start input, the over-voltage protection circuit comprising:

a third winding in magnetic communication with the first winding and the second winding, the third winding providing a voltage sense signal;

an over-voltage protection control circuit coupled to the third winding, the control circuit providing a shut down signal to the shut down input when the voltage sense signal is above a threshold, the threshold representing an over-voltage condition, removing the shut down signal when the voltage sense signal drops below the threshold, and providing a soft start signal to the soft start input at a predetermined time of about 500 milliseconds after the shut down signal is provided; P1 wherein the drive circuit performs a soft start in response to the soft start signal; and wherein a plurality of comparators generate the soft start signal.

2. A fluorescent lamp drive system for use with a display tube, the display system comprising:

a transformer having a primary winding, a secondary winding, and a tertiary winding, the secondary winding being coupled to the display tube, the secondary winding providing a high voltage display signal to the display tube;

a drive circuit having a shut down input, a soft start input and a drive signal output, the drive signal output being coupled to the first winding of the transformer, the drive circuit providing a drive signal at the drive signal output;

an over-voltage protection circuit coupled to the tertiary winding, the over-voltage protection circuit providing a shut down signal to the shut down input in response to a voltage across the tertiary winding being above a threshold, removing the shut down signal to the shut down input in response to the voltage across the tertiary winding being below a threshold, and providing a soft start signed to the soft start input at a predetermined time of 500 milliseconds after the shut down signal is provided, wherein the drive circuit disables the drive signal in response to the shut down signal;

wherein the drive circuit performs a soft start in response to the soft start signal; and wherein a second comparator, a third comparator, and a fourth comparator cooperate to generate the soft start signal.

3. A fluorescent lamp drive system including a display tube emitting light in response to a high voltage display signal, the fluorescent lamp drive system comprising:

a transformer means for receiving a low voltage drive signal and for generating the high voltage display signal, the transformer means generating a voltage sense signal indicative of the high voltage display signal voltage level;

a drive means for providing the drive signal;

an over-voltage protection means for disabling the display signal in response to the voltage sense signal:

wherein the over-voltage protection means disables the display signal by disabling the drive signal by providing a shut down signal to the drive means;

wherein the drive means includes a soft start input coupled to the over-voltage protection means, the over-voltage protection means producing a soft start signal at a predetermined time of about 500 milliseconds after the shut down signal is provided;

wherein the drive means performs a soft start in response to the soft start signal; and wherein a second comparator, a third comparator, and a fourth comparator cooperate to generate the soft start signal.

* * * * *